United States Patent [19]

Rumfield

[11] 4,014,830
[45] Mar. 29, 1977

[54] ACRYLATE OR METHACRYLATE MODIFIED ALKYD RESINS AND EPOXY ESTERS

[75] Inventor: Robert D. Rumfield, Louisville, Ky.
[73] Assignee: Celanese Coatings & Specialties Company, Louisville, Ky.
[22] Filed: Oct. 30, 1975
[21] Appl. No.: 627,447
[52] U.S. Cl. .................. 260/22 CB; 260/18 EP; 260/22 A; 260/33.6 EP
[51] Int. Cl.$^2$ .................. C08G 63/12; C08K 5/01
[58] Field of Search ........ 260/18 EP, 22 A, 22 CB, 260/33.6 EP

[56] References Cited
UNITED STATES PATENTS

| | | | |
|---|---|---|---|
| 2,965,590 | 12/1960 | Schumacher et al. | 260/18 EP |
| 3,366,563 | 1/1968 | Hart et al. | 260/22 R |
| 3,433,753 | 3/1969 | Farkas et al. | 260/22 A |
| 3,743,615 | 7/1973 | Yethon | 260/22 CB |
| 3,878,148 | 4/1975 | Gillan et al. | 260/18 EP |

*Primary Examiner*—Ronald W. Griffin
*Attorney, Agent, or Firm*—Herbert P. Price; K. A. Genoni; T. J. Morgan

[57] ABSTRACT

Air drying epoxy esters and alkyd resins are blended with polyacrylate esters of polyols. Coatings made from these blends have improved air-drying properties over the properties of coatings made from the unmodified resins, particularly in hardness and recoatability after overnight dry.

10 Claims, No Drawings

ACRYLATE OR METHACRYLATE MODIFIED ALKYD RESINS AND EPOXY ESTERS

BACKGROUND OF THE INVENTION

The field of art to which this invention pertains is air-drying unsaturated fatty acid resins, particularly alkyd resins and epoxy esters.

The use of alkyd resins and epoxy esters in air-drying coating applications has been known for many years. One of the problems with the use of these materials, however, has been the time required to effect complete drying of coatings made from such materials. In many applications of some alkyd resins and epoxy esters, it is very desirable to speed up the through-dry of the coatings and to obtain harder films after overnight dry. Many systems, particularly epoxy esters dissolved in aromatic solvents, e.g., xylene, have a serious deficiency — the inability to provide satisfactory self-recoat of coatings after overnight air-drying of the first coat. Historically, it has been necessary to allow the first coat to dry for 48 to 72 hours before attempting self-coat of such coatings. Earlier recoating has resulted in severe film lifting and film rupture or film delamination.

SUMMARY OF THE INVENTION

This invention relates to air-drying alkyd resins and epoxy esters. In particular this invention pertains to air-drying alkyd resins and epoxy esters having improved through-drying speeds, early film hardness and early solvent resistance.

The coating compositions of this invention are blends of air-drying alkyd resins or epoxy esters and polyacrylate or methacrylate esters of polyols wherein the polyacrylate or methacrylate ester is present in the amount of about 1 weight percent to about 10 weight percent based on the total weight of the blend.

DESCRIPTION OF THE INVENTION

The polyacrylate or methacrylate esters of polyols useful in this invention are esters which contain at least two acrylate or methacrylate ester groups and are derived from polyols which contain at least two aliphatic hydroxyl groups. The preferred esters are the di-, tri-, or tetra- acrylate or methacrylate esters of di-, tri-, or tetra- polyols. Examples of such esters include the acrylate or methacrylate esters derived from glycols, such as ethylene glycol, propylene glycol, neopentyl glycol, butanediol, hexanediol, and the like; those derived from triols, such as glycerine, trimethylolpropane and trimethylolethane; and those derived from tetrapolyols, such as pentaerythritol. Most preferred esters are hexanediol diacrylate, trimethylolpropane triacrylate, and pentaerythritol tetraacrylate. Of course, mixtures of these particular acrylates may be utilized and it is not required that a particular polyol be fully acrylated. Diacrylates of triols or tetraols, or triacrylates of tetraols can be used.

Other polyacrylate or methacrylate esters which can be used in this invention include those esters prepared by reacting acrylic or methacrylic acid with polyepoxides, e.g., the diglycidyl ethers of aromatic diphenols, e.g., bisphenol A, and the diglycidyl esters of dicarboxylic acids, e.g., hexahydrophthalic anhydride and dimerized fatty acids. In this invention the term "polyol" is intended to include polyepoxides.

These polyacrylates or methacrylates are blended with the alkyd resins or epoxy esters of the instant invention in the amounts of about 1 to about 10 weight percent based on the total weight of the blend, and, preferably, about 3 to about 7 weight percent.

The epoxy esters useful in this invention are formed by reacting an epoxide resin with an unsaturated fatty acid. Such epoxy esters are described in U.S. Pat. Nos. 2,456,408, 2,493,486, 2,500,765 and 3,247,136 which are hereby incorporated by reference.

Epoxide resins useful in making the epoxy esters include glycidyl ethers of polyhydric phenols obtained by reacting a polyhydric phenol with an epihalohydrin, e.g., epichlorohydrin. Such polyhydric phenols include bisphenol A (p,p'-dihydroxydiphenyl propane), resorcinol, hydroquinone, 4,4'-dihydroxybenzophenone, 4,4'-dihydroxybiphenyl and novolak resins containing more than two phenol moieties linked through methylene bridges. Preferred glycidyl ethers are those derived from bisphenol A having epoxide equivalent weights of about 450 to about 2,000.

The drying oil fatty acids which are reacted with the epoxide resins to form the epoxy esters are unsaturated fatty acids derived from drying oils. Examples of oils from which such acids are derived are linseed oil, soybean oil, dehydrated castor oil, cocoanut oil, corn oil, oticica oil, perilla oil, safflower oil, tung oil and the like. Tall oil fatty acids are particularly useful. The unsaturated fatty acids are mixtures of acids which contain about 16 to about 24 carbon atoms per molecules. Such fatty acids are mixtures of palmitoleic acid, oleic acid, erucic acid, dehydrated ricinoleic acid, linoleic acid, linolenic acid and licanic acid.

In preparing the epoxy esters useful in this invention, sufficient acids are used to react with all of the epoxide groups of the resin and at least a portion of the hydroxyl groups. The amount of acid reacted, based on the weight of the epoxy ester, will range from about 35 weight percent to about 60 weight percent and preferably about 40 to about 50 weight percent.

The methods for preparing the alkyd resins useful in this invention are well-known in the art. In general, two methods are used. In the first, a fatty acid is reacted with a mixture of polyols and polybasic acids, such as glycerine and phthalic anhydride. The second method commonly used entails the alcoholysis of a fatty oil, such as linseed oil, with a polyol, such as pentaerythritol, and then the further condensation of such reaction products with polyols and polybasic acids.

The various fatty acids or oils used to prepare the alkyd resin have been previously described. Other fatty acids derived from non-drying oils can be utilized as long as the alkyd itself contains the desired minimum of drying oil or fatty acid.

Useful polyols for preparing the alkyd resins of the instant invention include the various glycols, such as ethylene glycol, propylene glycol, neopentyl glycol, butylene glycol, 1,4-butanediol, hexylene glycol, 1,6-hexanediol, the polyglycols, such as diethylene glycol or triethylene glycol, etc.; the triols such as glycerine, trimethylolethane, trimethylolpropane, etc., and other higher functional alcohols such as pentaerythritol, sorbitol, mannitol, and the like. Other carboxylic acids useful in preparing the alkyd resins of this invention include monofunctional acids, such as rosin acids, benzoic acid, paratertiary butyl benzoic acid, and the like; the polyfunctional acids, such as adipic acid, azelaic acid, sebacic acid, phthalic acid or anhydride, isophthalic acid, terephthalic acid, dimerized and polymerized fatty acids, trimellitic acid, and the like.

The alkyd resins useful in this invention contain about 30 to about 80 weight percent, based on the total weight of the resin, of reacted unsaturated fatty acid and preferably 50 to about 65 weight percent.

The compositions of this invention are reduced to application viscosities with solvents. Generally the amount of solvent will vary from about 20 to about 70 weight percent based on the weight of the solution and preferably about 40 to about 60 weight percent. When formulated into a paint, additional solvent can, of course, be added. Examples of solvents are the various aromatic and aliphatic hydrocarbons, e.g., toluene, xylene, mixed aromatic hydrocarbons, hexane, heptane, octane, mineral spirits and the like. Additional solvents, such as alcohols, ethers, ether-alcohols, ketones and esters can also be used.

In formulating the compositions of this invention into air-drying coating compositions, driers are incorporated into the formula to accelerate the oxidation curing mechanism. The driers for the most part are heavy metal salts of organic acids, e.g., lead, cobalt, manganese, zirconium, calcium, zinc and iron linolates, naphthenates, resinates, octoates, tallates and the like. Driers are described in detail in "Organic Coating Technology," Volume I, by H. F. Payne, Chapter 5, which is hereby incorporated by reference. The amount of driers used in the compositions of this invention is from trace amounts, i.e., about 0.01 weight percent metal, up to about 1 weight percent metal, based on the total weight of the composition. The amount of driers will vary widely between these limits depending on the particular driers and the particular mixture of driers that are used.

In preparing the compositions of this invention, the polyacrylate or methacrylate ester of the polyol can simply be added to a solution of an alkyd resin or epoxy ester which had previously been prepared. The polyacrylate or methacrylate ester can also be added to the epoxy ester or alkyd resin in the manufacturing reactor after the epoxy ester or alkyd resin has been formed but before it has been removed from the reactor.

Using well known procedures, the compositions of this invention can be converted into paints by the addition of pigments, fillers, flow control agents, leveling agents, anti-skinning agents and any other materials commonly used in air-drying coating compositions. The compositions after grinding and mixing can be applied to a desired substrate by brushing, spraying, dipping and the like.

In the following examples, parts and percentages are by weight unless otherwise specified.

EXAMPLE 1

To a suitable reactor were added 40.26 parts of the diglycidyl ether of bisphenol A having an epoxide equivalent weight of 190, 16.44 parts of bisphenol A and 0.03 part of 45% solution of potassium hydroxide in water. Agitation was begun and heat was applied raising the temperature of the reactants to 325° F. At this temperature, heating was stopped but the temperature rose to 450° F. due to the exothermic reaction. The temperature was allowed to drop to 380° F. and was held at 380° F. until the Gardner-Holdt viscosity at 25° C. was R at 40% N.V. in the monobutyl ether of diethylene glycol. Tall oil fatty acids, 31.42 parts, and 0.03 part of sodium benzoate were added to the reactor. The temperature was slowly raised to 520° F. while using a xylene azeotrope. The temperature was held at 520° F. under a strong xylene reflux while removing water of esterification until the acid value was reduced below 10. Dimerized tall oil fatty acids (80% dimer, 17% trimer and 3% monomer), 6.4 parts, were then added and heating at 500°–510° F. was continued until the acid value was reduced to 2.5. The temperature of reaction was reduced to 125° F., 0.33 part of triethyl amine, 0.17 part of cyclohexanone oxime and 5.0 parts of trimethylolpropane triacrylate were added. When thoroughly mixed, xylene was added to reduce the solids content to 50%. The resulting product had a Gardner-Holdt viscosity at 25° C. of V-W, an acid value of 2.5 on solids basis, a weight per gallon of 8.08 pounds and a Gardner color of 7.

Driers were added to a portion of the modified epoxy ester solution and films were prepared on glass using a 3 mil doctor blade. Films, for comparison purposes, were also prepared from an epoxy ester which did not contain the trimethylolpropane triacrylate modification. The pencil hardness of these films is shown in the following table. The % drier (Pb, Co, Mn, Zr) refers to the percent metal added as drier based on the weight of the epoxy ester or the blend of epoxy ester and polyacrylate.

TABLE I

| | | Hardness, Pencil | | | |
| | | Films Aged | | | |
| | | 24 hrs. | | 48 hrs. | |
| Resin | Driers | R.T. | 125F. | R.T. | 125F. |
|---|---|---|---|---|---|
| Modified | .3 Pb, .05 Co, .03 Mn | B | B | HB | HB |
| Unmodified | .3 Pb, .05 Co, .03 Mn | 4B | 4B | B | B |
| Modified | .1 Zr, .05 Ca, .16 Co | B | B | HB | HB |
| Unmodified | .1 Zr, .05 Ca, .16 Co | 3B | 3B | B | B |

The recoatability of the epoxy esters was determined by preparing a film of the epoxy ester on glass, letting it dry for a set period, drawing down a film of the same ester over the dried film and determining the degree of lifting of the dried film.

TABLE II

| | | Recoat Properties | | | | | | | |
| | | Recoat in Hours | | | | | | | |
| | | .002 Blade | | | | .003 Blade | | | |
| Resin | Driers | 8 | 16 | 24 | 30 | 8 | 16 | 24 | 30 |
|---|---|---|---|---|---|---|---|---|---|
| Modified | .3 Pb, .05 Co, .03 Mn | OK | OK | OK | OK | S | S | S | OK |

TABLE II-continued

| Resin | Driers | Recoat Properties Recoat in Hours | | | | | | | |
|---|---|---|---|---|---|---|---|---|---|
| | | .002 Blade | | | | .003 Blade | | | |
| | | 8 | 16 | 24 | 30 | 8 | 16 | 24 | 30 |
| Unmodified | .3 Pb, .05 Co, .03 Mn | S | S | S | OK | S | S | S | S |
| Modified | 0.1 Zr, .05 Ca, .16 Co | OK | OK | OK | OK | OK | OK | OK | OK |
| Unmodified | 0.1 Zr, .05 Ca, .16 Co | S | OK | OK | OK | S | S | S | S |

S = Severe Lifting

EXAMPLE 2

To a suitable reactor were added 35.26 parts of the diglycidyl ester of bisphenol A having an epoxide equivalent weight of 190, 14.4 parts of bisphenol A and 0.023 part of a 45% solution of potassium hydroxide in water. Agitation was begun and heat was applied raising the temperature of the reactants to 325° F. When this temperature was reached, heating was stopped and the temperature rose to 430° F. due to the exothermic reaction. The temperature slowly dropped to 380° F. and was held at this temperature until the Gardner-Holdt viscosity at 25° C. was at 40% N.V. in the monobutyl ether of diethylene glycol. Tall oil fatty acids, 27.52 parts, and 0.024 part of sodium benzoate were added to the reactor. The temperature, which had dropped below 300° F., was raised to 325° F. and was held here for 30 minutes. The temperature was then raised to 520° F. while using a xylene azeotrope. The temperature was held at 520° F. under a strong xylene reflux while removing water of esterification until the acid value was reduced below 10. Dimerized tall oil fatty acids, 5.59 parts, were then added and heating at 500° F. was continued until the acid value was reduced below 2.5 and the Gardner-Holdt viscosity at 25° C. and at 40% solids in xylene was L. The reaction product was cooled, reduced to 50% N.V. in xylene and filtered through a filter press. The resulting product had a Gardner-Holdt viscosity at 25° C. of X, an acid value, on solids basis of 2, a weight per gallon of 7.9 pounds and a Gardner color of 7.

To 90 parts of the epoxy ester solution were added 5 parts of trimethylolpropane triacrylate and 0.127 part of Troykyl Anti-Skin Agent obtained from Troy Chemical Co. and 5 parts of xylene. Driers were then added to the solution in the amounts described in Example 1. When tested as to hardness and recoatability using the procedure described in Example 1, results equal to those of Example 1 were obtained.

EXAMPLE 3

An alkyd resin, 95 parts on solids basis, made from 58.4 parts tall oil fatty acids, 15.5 parts pentaerythritol, 26.8 parts phthalic anhydride and 6.4 parts glycerine having an acid value of 5 and a Gardner-Holdt viscosity at 25° C. of $Z_4$ at 70% solids in petroleum thinner was blended with 5 parts trimethylolpropane triacrylate. The blend was reduced to 50% solids with mineral spirits and dryers, 0.03% Co and 0.5% Pb, were added. When drawn down into films, through-hardness was obtained in 3 to 3.5 hours versus 5 hours for the alkyd without the polyacrylate modification. On air dry overnight, films of the modified alkyd system obtained a pencil hardness of 2B whereas the hardness of the unmodified films were 5B to 6B.

EXAMPLE 4

To a ball mill were added 100 parts of rutile titanium dioxide, 3 parts of lampblack, 2 parts of Bentone 11 Thixotrope obtained from NL Industries, 3 parts of X-2280 Anti-Flooding Compound obtained from Hercules, Inc., 202 parts of the epoxy ester-trimethylol propane triacrylate solution in xylene described in Example 1 and 71.9 parts of xylene. The mixture was steel ball milled for 20 hours. After removal from the mill, 404 parts of the epoxy ester-trimethylol propane triacrylate solution described above, 5 parts of 6% zirconium octoate drier, 3 parts of 5% calcium octoate drier, 1.5 parts of Cobalt 254 Feeder Drier obtained from Tenneco Chemicals and 73.9 parts of xylene were added and thoroughly mixed with the grind.

Films of the resulting gray enamel were drawn down on glass with a 2 mil and a 3 mil doctor blade. The films were recoated with the gray enamel after air-drying at room temperature for 8, 16, 24 and 30 hour intervals. No film lifting, film rupture, or film delamination was noted.

It is to be understood that the foregoing detailed description is given merely by way of illustration and that many variations may be made therein without departing from the spirit of the invention.

What is claimed is:

1. A coating composition comprising an air-drying unsaturated fatty acid alkyd resin or epoxy ester blended with about 1 weight percent to about 10 weight percent, based on the total weight of the blend, of a polyacrylate or polymethacrylate ester of a polyol.

2. The composition of claim 1 wherein the polyacrylate or polymethacrylate ester of the polyol is present in the amount of about 3 to about 7 weight percent.

3. The composition of claim 1 wherein the epoxy ester is an ester of an unsaturated drying oil fatty acid and a glycidyl ether of a dihydric phenol containing about 35 to about 60 weight percent, based on the weight of the ester, of reacted acid.

4. The composition of claim 3 wherein the acid is present in the amount of about 40 to about 50 weight percent.

5. The composition of claim 1 wherein the alkyd resin contains about 30 to about 80 weight percent reacted unsaturated drying oil fatty acid.

6. The composition of claim 5 wherein the acid is present in the amount of about 50 to about 65 weight percent.

7. The composition of claim 1 wherein the polyacrylate ester is hexanediol diacrylate.

8. The composition of claim 1 wherein the polyacrylate is trimethylol propane triacrylate.

9. The composition of claim 1 wherein the polyacrylate is pentaerythritol triacrylate.

10. A coating composition, dissolved in an aromatic hydrocarbon, comprising a tall oil fatty acid ester of a glycidyl polyether of bisphenol A containing 40 to 50 weight percent, based on the weight of the ester, of the reacted tall oil fatty acid blended with about 3 to about 7 weight percent, based on the weight of the blend, of trimethylolpropane triacrylate.

* * * * *